(12) United States Patent
Park et al.

(10) Patent No.: US 12,039,449 B2
(45) Date of Patent: Jul. 16, 2024

(54) METHOD AND APPARATUS WITH NEURAL NETWORK META-TRAINING AND CLASS VECTOR TRAINING

(71) Applicants: SAMSUNG ELECTRONICS CO., LTD., Suwon-si (KR); Korea Advanced Institute of Science and Technology, Daejeon (KR)

(72) Inventors: Seong-Jin Park, Suwon-si (KR); Sung Ju Hwang, Daejeon (KR); Seungju Han, Seoul (KR); Insoo Kim, Seongnam-si (KR); Jiwon Baek, Hwaseong-si (KR); Jaejoon Han, Seoul (KR)

(73) Assignees: Samsung Electronics Co., Ltd., Suwon-si (KR); Korea Advanced Institute of Science and Technology, Daejeon (KR)

( * ) Notice: Subject to any disclaimer, the term of this patent is extended or adjusted under 35 U.S.C. 154(b) by 827 days.

(21) Appl. No.: 17/119,381

(22) Filed: Dec. 11, 2020

(65) Prior Publication Data
US 2021/0241098 A1 Aug. 5, 2021

Related U.S. Application Data

(60) Provisional application No. 62/970,297, filed on Feb. 5, 2020.

(30) Foreign Application Priority Data

Jun. 24, 2020 (KR) .................. 10-2020-0077127

(51) Int. Cl.
*G06N 3/08* (2023.01)
*G06F 17/18* (2006.01)
(Continued)

(52) U.S. Cl.
CPC ............. *G06N 3/082* (2013.01); *G06F 17/18* (2013.01); *G06F 18/10* (2023.01); *G06F 18/213* (2023.01);
(Continued)

(58) Field of Classification Search
None
See application file for complete search history.

(56) References Cited

U.S. PATENT DOCUMENTS 7,496,546 B2 * 2/2009 Hoya ....................... G06N 3/04
706/26
8,312,291 B2 * 11/2012 Golic .................. G06V 40/172
713/172
(Continued)

FOREIGN PATENT DOCUMENTS

JP 2012-049792 A 3/2012
JP 2016-161823 A 9/2016
(Continued)

OTHER PUBLICATIONS

Wang, Yu-Xiong, et al. "Low-shot learning from imaginary data." Proceedings of the IEEE conference on computer vision and pattern recognition. 2018 (9 pages in English).

*Primary Examiner* — Maikhanh Nguyen
(74) *Attorney, Agent, or Firm* — NSIP Law

(57) ABSTRACT

A processor-implemented neural network method includes: extracting, by a feature extractor of a neural network, a plurality of training feature vectors corresponding to a plurality of training class data of each of a plurality of classes including a first class and a second class; determining, by a feature sample generator of the neural network, an additional feature vector of the second class based on a mean vector and a variation vector of the plurality of training feature vectors of each of the first class and the second class; and training a class vector of the second class included in a
(Continued)

classifier of the neural network based on the additional feature vector and the plurality of training feature vectors of the second class.

14 Claims, 8 Drawing Sheets

(51) Int. Cl.
*G06F 18/10* (2023.01)
*G06F 18/213* (2023.01)
*G06F 18/2415* (2023.01)
*G06F 18/2431* (2023.01)
*G06N 3/082* (2023.01)
*G06V 10/44* (2022.01)
*G06V 10/764* (2022.01)
*G06V 10/774* (2022.01)
*G06V 40/16* (2022.01)

(52) U.S. Cl.
CPC ...... *G06F 18/2415* (2023.01); *G06F 18/2431* (2023.01); *G06N 3/08* (2013.01); *G06V 10/454* (2022.01); *G06V 10/764* (2022.01); *G06V 10/774* (2022.01); *G06V 40/168* (2022.01); *G06V 40/174* (2022.01)

(56) References Cited

U.S. PATENT DOCUMENTS

| | | | | |
|---|---|---|---|---|
| 11,341,365 | B2* | 5/2022 | Park | G06F 18/214 |
| 11,568,240 | B2* | 1/2023 | Song | G06N 3/08 |
| 2002/0135618 | A1* | 9/2002 | Maes | G10L 15/24 |
| | | | | 715/767 |
| 2003/0149558 | A1* | 8/2003 | Holsapfel | G10L 13/10 |
| | | | | 704/4 |
| 2012/0133742 | A1 | 5/2012 | Ertl | |
| 2015/0058172 | A1 | 2/2015 | Nandyal et al. | |
| 2016/0092766 | A1* | 3/2016 | Sainath | G06N 3/048 |
| | | | | 706/20 |
| 2016/0162805 | A1* | 6/2016 | Kwon | G06N 3/08 |
| | | | | 706/20 |
| 2017/0025117 | A1* | 1/2017 | Hong | G10L 15/063 |
| 2017/0193668 | A1 | 7/2017 | Chen | |
| 2018/0028079 | A1 | 2/2018 | Gurevich et al. | |
| 2018/0247107 | A1* | 8/2018 | Murthy | G06V 20/698 |
| 2018/0285731 | A1* | 10/2018 | Heifets | G06N 3/04 |
| 2018/0293499 | A1* | 10/2018 | He | G06F 40/30 |
| 2019/0325269 | A1 | 10/2019 | Bagherinezhad et al. | |
| 2022/0114836 | A1* | 4/2022 | Kim | G06N 3/084 |

FOREIGN PATENT DOCUMENTS

| | | |
|---|---|---|
| JP | 2019-008349 A | 1/2019 |
| KR | 10-2009-0007909 A | 1/2009 |
| KR | 10-2011-0105458 A | 9/2011 |
| KR | 10-2016-0128275 A | 11/2016 |
| KR | 10-2018-0038319 A | 4/2018 |
| KR | 10-1843066 B1 | 5/2018 |
| KR | 10-2034248 B1 | 10/2019 |
| KR | 10-2019-0142856 A | 12/2019 |

* cited by examiner

METHOD AND APPARATUS WITH NEURAL NETWORK META-TRAINING AND CLASS VECTOR TRAINING

CROSS-REFERENCE TO RELATED APPLICATIONS

This application claims the benefit under 35 USC 119(e) of U.S. Provisional Application No. 62/970,297 filed on Feb. 5, 2020, and the benefit under 35 USC 119(a) of Korean Patent Application No. 10-2020-0077127 filed on Jun. 24, 2020, in the Korean Intellectual Property Office, the entire disclosures of which are incorporated herein by reference for all purposes.

BACKGROUND

1. Field

The following description relates to a method and apparatus with neural network meta-training and class vector training.

2. Description of Related Art

A methodology of configuring an artificial neural network may be referred to as a neural network model. In neural network models, artificial neurons may be connected by directional edges (synapses) to form a network, and signals input to the edges from outputs of pre-synaptic neurons connected to the edges may be summed in dendrites and processed in the main body (soma) of the neurons. Each neuron may have unique state and attribute values, and soma may update state values of post-synaptic neurons and calculate new output values based on the input from the dendrites. The output values may be transmitted through input edges of other neurons and affect adjacent neurons. Each of the edges between the neurons may also have a plurality of intrinsic state and attribute values, which serve to adjust the intensities of signals transmitted by the edges. A state value of an edge that is most commonly used in neural network models may be a weight indicating a connection strength of the edge. The state value may vary for each calculation after initially designated, and the attribute value may be invariant once designated.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a processor-implemented neural network method includes: extracting, by a feature extractor of a neural network, a plurality of training feature vectors corresponding to a plurality of training class data of each of a plurality of classes including a first class and a second class; determining, by a feature sample generator of the neural network, an additional feature vector of the second class based on a mean vector and a variation vector of the plurality of training feature vectors of each of the first class and the second class; and training a class vector of the second class included in a classifier of the neural network based on the additional feature vector and the plurality of training feature vectors of the second class.

The training may include training the class vector of the second class to reduce a distance between the class vector of the second class and a feature vector of training input data corresponding to the second class with respect to a distance between a class vector of each of the plurality of classes and the feature vector of the training input data.

The training may include training the class vector of the second class using a loss function, and the loss function may include a ratio of an exponential value of a negative distance of a correct answer class to a summation of exponential values of respective negative distances of the plurality of classes.

The loss function may include a softmax function.

The variation vector may include either one of a variance vector and a standard deviation vector of the plurality of training feature vectors.

The mean vector may be a vector of an elementwise mean value of the plurality of training feature vectors, the variance vector may be a vector of an elementwise variance of the plurality of training feature vectors, and the standard deviation vector may be a vector of an elementwise standard deviation of the plurality of training feature vectors.

The determining may include: combining the mean vector of the first class, the variation vector of the first class, the mean vector of the second class, and the variation vector of the second class; outputting a compressed variation vector from a result of the combining; and determining the additional feature vector based on the compressed variation vector and the mean vector of the second class.

The determining of the additional feature vector based on the compressed variation vector and the mean vector of the second class may include determining the additional feature vector using a Gaussian probability distribution based on the compressed variation vector and the mean vector of the second class.

The determining of the additional feature vector based on the compressed variation vector and the mean vector of the second class may include: generating a plurality of feature vectors using the Gaussian probability distribution; and determining the additional feature vector by sampling the generated plurality of feature vectors.

A non-transitory computer-readable storage medium may store instructions that, when executed by one or more processors, configure the one or more processors to perform the method.

In another general aspect, a processor-implemented neural network method includes: extracting, by a feature extractor of a neural network, a plurality of training feature vectors corresponding to a plurality of training class data of each of a plurality of classes including a third class and a fourth class; determining, by a feature sample generator of the neural network, an additional feature vector of the fourth class based on a mean vector and a variation vector of the plurality of training feature vectors of each of the third class and the fourth class; determining, by a classifier of the neural network, a class vector of the fourth class based on the additional feature vector and the plurality of training feature vectors of the fourth class; and training the feature extractor, the feature sample generator, and the classifier to reduce a distance between the class vector of the fourth class and a feature vector of training input data corresponding to the fourth class.

The training may include training the feature extractor, the feature sample generator, and the classifier to reduce the distance between the class vector of the fourth class and the feature vector of the training input data corresponding to the fourth class with respect to a distance between a class vector of each of the plurality of classes including the fourth class and the feature vector of the training input data.

In another general aspect, a neural network apparatus includes: a memory configured to store a neural network including a feature extractor, a feature sample generator, and a classifier; and one or more processors configured to: extract, by the feature extractor, a plurality of training feature vectors corresponding to a plurality of training class data of each of a plurality of classes including a first class and a second class, determine, by the feature sample generator, an additional feature vector of the second class based on a mean vector and a variation vector of the plurality of training feature vectors of each of the first class and the second class, determine, by the classifier, a class vector of the second class based on the additional feature vector and the plurality of training feature vectors of the second class, and train the class vector of the second class to reduce a distance between the class vector of the second class and a feature vector of training input data.

The one or more processors may be further configured to: extract, by the feature extractor, a feature vector of received input data; and recognize, by the classifier, a class of the received input data as the second class, based on the trained class vector of the second class.

In another general aspect, a neural network apparatus includes: a memory configured to store a neural network including a feature extractor, a feature sample generator, and a classifier; and one or more processors configured to: extract, by the feature extractor, a plurality of training feature vectors corresponding to a plurality of training class data of each of a plurality of classes including a third class and a fourth class, determine, by the feature sample generator, an additional feature vector of the fourth class based on a mean vector and a variation vector of the plurality of training feature vectors of each of the third class and the fourth class, determine, by the classifier, a class vector of the fourth class based on the additional feature vector and the plurality of training feature vectors of the fourth class, and train the feature extractor, the feature sample generator, and the classifier to reduce a distance between the class vector of the fourth class and a feature vector of training input data corresponding to the fourth class.

In another general aspect, a processor-implemented training method includes: extracting, by a feature extractor of a neural network, a plurality of training feature vectors of training class data of a class; generating, by a feature sample generator of a neural network, a variation vector of the class based on the extracted training feature vectors of training class data of the class; generating, by the feature sample generator, an additional feature vector of another class based the variation vector of the class; and training the neural network based on the additional feature vector.

The training of the neural network may include either one or both of: training the feature extractor, the feature sample generator, and a classifier of the neural network to reduce a distance between a class vector of the other class, determined based on the additional feature vector, and a feature vector of training input data corresponding to the other class; and using the trained feature extractor, the trained sample generator, and the trained classifier, training the class vector of the other class based on the additional feature vector and a plurality of training feature vectors of training class data of the other class.

The generating of the additional feature vector may be further based on a variation vector of the other class, the variation vector of the class may indicate a variation between the training class data of the class in any one of illuminance, posture, facial expression, occlusion, shape change, and noise, and the variation vector of the other class may indicate a variation between the training class data of the other class in any other one of illuminance, posture, facial expression, occlusion, shape change, and noise.

Other features and aspects will be apparent from the following detailed description, the drawings, and the claims.

Figure 1A:
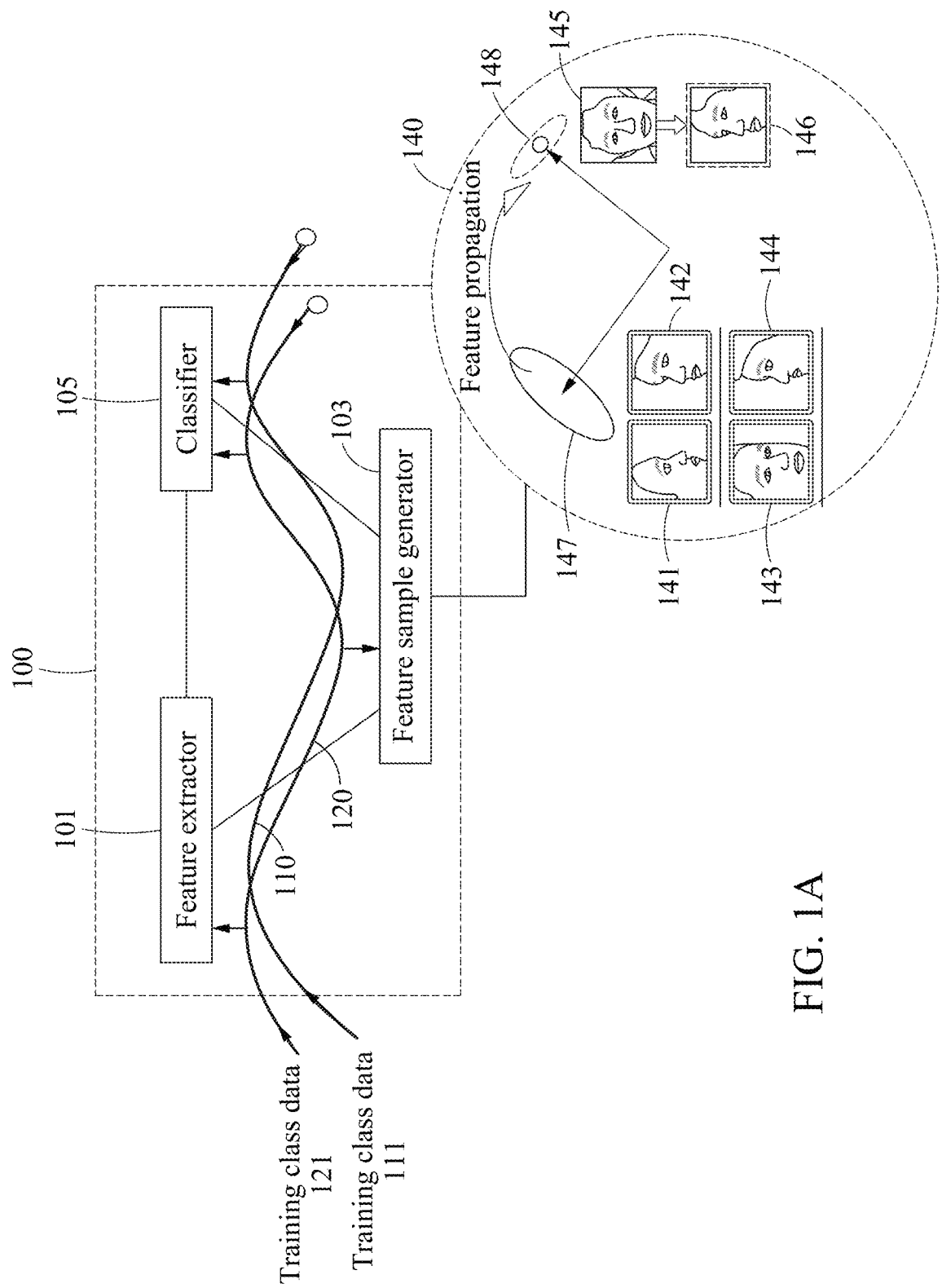
FIG. 1A illustrates an example of two operations for training a recognition apparatus.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art, after an understanding of the disclosure of this application, may be omitted for increased clarity and conciseness.

Hereinafter, examples will be described in detail with reference to the accompanying drawings. However, various alterations and modifications may be made to the examples. Here, the examples are not construed as limited to the disclosure. The examples should be understood to include all changes, equivalents, and replacements within the idea and the technical scope of the disclosure.

The terminology used herein is for the purpose of describing particular examples only and is not to be limiting of the present disclosure. As used herein, the singular forms "a", "an", and "the" are intended to include the plural forms as well, unless the context clearly indicates otherwise. As used herein, the term "and/or" includes any one and any combination of any two or more of the associated listed items. As used herein, the terms "include," "comprise," and "have" specify the presence of stated features, numbers, operations, elements, components, and/or combinations thereof, but do not preclude the presence or addition of one or more other features, numbers, operations, elements, components, and/or combinations thereof. The use of the term "may" herein with respect to an example or embodiment (for example, as to what an example or embodiment may include or implement) means that at least one example or embodiment exists where such a feature is included or implemented, while all examples are not limited thereto.

Unless otherwise defined, all terms including technical and scientific terms used herein have the same meaning as commonly understood by one of ordinary skill in the art to which this disclosure pertains consistent with and after an understanding of the present disclosure. It will be further understood that terms, such as those defined in commonly-used dictionaries, should be interpreted as having a meaning that is consistent with their meaning in the context of the relevant art and the present disclosure, and will not be interpreted in an idealized or overly formal sense unless expressly so defined herein.

When describing the examples with reference to the accompanying drawings, like reference numerals refer to like constituent elements and a repeated description related thereto will be omitted. In the description of examples, detailed description of well-known related structures or functions will be omitted when it is deemed that such description will cause ambiguous interpretation of the present disclosure.

Although terms of "first" or "second" are used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween. Likewise, expressions, for example, "between" and "immediately between" and "adjacent to" and "immediately adjacent to" may also be construed as described in the foregoing.

The same name may be used to describe an element included in the examples described above and an element having a common function. Unless otherwise mentioned, the descriptions on the examples may be applicable to the following examples and thus, duplicated descriptions will be omitted for conciseness.

FIG. 1A illustrates an example of two operations for training a recognition apparatus.

A training apparatus 100 may train a neural network through two operations. The neural network may include a feature extractor 101, a feature sample generator 103, and a classifier 105. The neural network may first train the feature extractor 101, the feature sample generator 103, and the classifier 105 through meta-training 120, and then train class vectors of classes included in the classifier 105 through class vector training 110.

The training apparatus 100 may perform the class vector training 110 and the meta-training 120. The feature sample generator 103 may configure the neural network of the training apparatus 100 in conjunction with the feature extractor 101 and the classifier 105. In the class vector training 110, the training apparatus 100 may train class vectors of one or more classes included in the classifier 105 using training data. In the meta-training 120, the training apparatus 100 may train the feature extractor 101, the feature sample generator 103, and the classifier 105 used in the class vector training 110 in advance of the class vector training 110. Here, a class may refer to a category item having the same characteristics. For example, when the training data corresponds to images of users, each category item may correspond to a different user, such that each class may correspond to a different user. A class vector may be a vector representing a corresponding class, and the probability that the class vector belongs to the corresponding class may increase as a distance between a feature vector of the input data and the class vector decreases. The training data may be classified by class. Hereinafter, the training data classified by class will be referred to as training class data for each class.

To increase the accuracy of training, training class data having diverse variations may be used for the training. Due to the limited costs for data collection, a set of training class data collected for each class may have limited variations. When the types of variations are limited, the recognition accuracy for input data reflecting different types of variations may be lower than when the types of variations are not so limited. A variation may refer to a difference between data and may be referred to as a deviation. For example, the variation may include shape change, noise, illuminance, posture, or occlusion, but is not limited thereto.

A single class may include limited variation, but a plurality of classes may include different variations. Adding training class data to a class using variations of a set of actually collected training class data of a predetermined class may improve the training accuracy compared to generating theoretical training class data. For example, compared to theoretical data augmentation methods such as color jittering, image cropping, or random noise, the variations of the set of actually-collected training class data of different classes may better reflect reality.

In addition, in the case of a typical generative model, such as a generative adversarial network (GAN), training may not be performed simultaneously with a classifier, and thus, a new image irrelevant to recognition performance may be generated. In contrast, unlike the typical generative model, the training apparatus 100 of one or more embodiments may not generate the new image, but rather may increase the recognition accuracy through data augmentation. Accordingly, the training apparatus 100 may simultaneously train the feature sample generator 103 for propagating features and the classifier 105 for classifying and recognizing classes, thereby generating a trained neural network having higher accuracy than a trained neural network generated by the typical generative model.

To this end, the training apparatus 100 may first perform the meta-training 120. In the meta-training 120, the training apparatus 100 may train the feature extractor 101, the feature sample generator 103, and the classifier 105 used in the class vector training 110, in advance of the class vector training 110. In the meta-training 120, the training apparatus 100 may train the neural network in advance using training class data 121 of various types of classes. For example, each training class data 121 may be of a respective class. Through the meta-training 120, the feature extractor 101 may better extract features from predetermined training class data, the feature sample generator 103 may better propagate the characteristics of sets of different training class data, and the classifiers105 may obtain more accurate class vectors.

Figure 5:
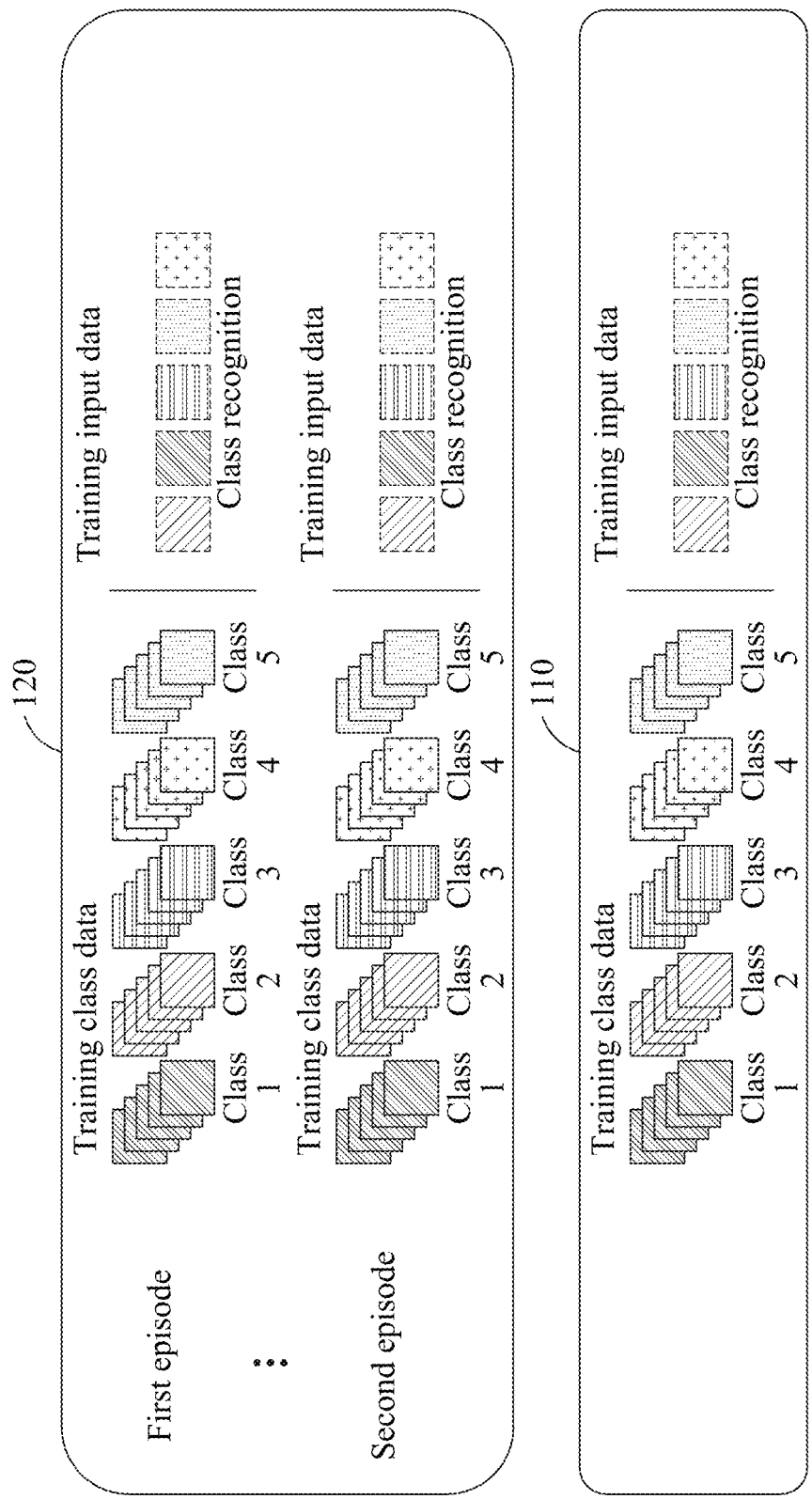
FIG. 5 illustrates an example of a meta-training method and a class vector training method.

In the meta-training 120, the training apparatus 100 may train the feature extractor 101, the feature sample generator 103, and the classifier 105 based on training class data 121 of various classes. For example, the training apparatus 100 may train the neural network for a plurality of episodes. A single episode may include a plurality of training class data 121 for each class. For example, each training class data 121, of the plurality of training class data 121, may be of a respective class, and each episode may include a plurality of training class data 121 for each class (e.g., training class data 121 of class 1, training class data 121 of class 2, training class data 121 of class 3, training class data 121 of class 4, and training class data 121 of class 5, as shown in FIG. 5 further discussed below). The plurality of training class data 121 collected for each of the plurality of classes may be referred to as a support set.

Training class data 121 for each class of different episodes may be different from each other. For example, training class data 121 of a class of an episode may be different from training class data 121 of the class of another episode. Each episode may correspond to a set of predetermined training class data 121 for a plurality of classes. Recognizing training input data for one or more episodes may be referred to as few-shot learning. In this process, the training apparatus 100 may perform end-to-end learning.

In the meta-training 120, in one episode, the training apparatus 100 may extract a feature vector from each of training class data 121 for each class. The feature extractor 101 may extract a plurality of training feature vectors corresponding to the plurality of training class data 121 of each of a plurality of classes including a third class and a fourth class. For example, the feature extractor 101 may extract a plurality of training feature vectors from the training class data 121 of the third class and may extract a plurality of training feature vectors from the training class data 121 of the fourth class. The training apparatus 100 may calculate a variation vector of the plurality of feature vectors for each class. The variation vector may indicate a degree of variation between training class data of a given class. For example, the training apparatus 100 may calculate a variation vector of the training class data 121 of the third class, indicating a degree of variation between the training class data 121 of the third class, based on the plurality of training feature vectors extracted from the training class data 121 of the third class; and the training apparatus 100 may calculate a variation vector of the training class data 121 of the fourth class, indicating a degree of variation between the training class data 121 of the fourth class, based on the plurality of training feature vectors extracted from the training class data 121 of the fourth class. Here, the third class and the fourth class are named to be distinguished from classes which will be further described below for the class vector training 110 (e.g., the third class and the fourth class do not necessarily correspond to Class 3 and Class 4 of FIG. 5 discussed further below, and are rather named to be distinguished from classes which will be further described below for the class vector training 110). Feature propagation may be performed in a direction from the third class to the fourth class.

The training apparatus 100 may propagate a variation vector of one class to another class. The training apparatus 100 may apply a variation vector of one class to another class. The training apparatus 100 may add training class data to the other class using the variation vector of the one class. The feature sample generator 103 may obtain (e.g., determine) an additional feature vector to be added to the fourth class based on a mean vector and a variation vector for the plurality of training feature vectors of each of the third class and the fourth class. For example, the feature sample generator 103 may determine an additional feature vector to be added to the fourth class by propagating the variation vector of the training class data 121 of the third class to the fourth class, and may determine and add new training class data to the fourth class based on the determined additional feature vector.

The training apparatus 100 may derive a class vector of the fourth class using the training class data added to the fourth class and the existing training class data of the fourth class. The classifier 105 may obtain the class vector of the fourth class based on the additional feature vector and the plurality of training feature vectors of the fourth class. The aforementioned processes of the meta-training 120 may be performed for all classes.

The training apparatus 100 may input training input data into the neural network and train the neural network to increase the recognition accuracy based on an output of the neural network. The training apparatus 100 may train the feature extractor 101, the feature sample generator 103, and the classifier 105 to reduce a distance between a feature vector of the training input data and the derived class vector of the fourth class.

After the meta-training 120 (or when the meta-training 120 is completed), the training apparatus 100 may perform the class vector training 110. The training apparatus 100 may perform data augmentation using the feature sample generator 103 and train class data of each class using the augmented training class data. The training apparatus 100 may perform data augmentation by sharing the characteristics of sets of training class data of different classes. The training apparatus 100 may propagate the characteristics of a set of training class data of a predetermined class to a set of training class data of another class.

For example, for the class vector training 110, the feature extractor 101 may extract a plurality of training feature vectors corresponding to the plurality of training class data 111 of each of a plurality of classes including a first class and a second class. The feature sample generator 103 may obtain an additional feature vector to be added to the second class based on a mean vector and a variation vector for the plurality of training feature vectors of each of the first class and the second class. The classifier 105 may train the class vector of the second class based on the additional feature vector and the plurality of training feature vectors of the second class. Here, the first class and the second class are named to be distinguished from the classes which has been described in the meta-training 120. Feature propagation may be performed in a direction from the first class to the second class.

Prior to the class vector training 110, the type and degree of deviation of the training class data 111 for each class may be limited. The deviation of the plurality of training class data of the first class and the deviation of the plurality of training class data of the second class may be different. For example, the plurality of training class data of the first class may have different postures, and the plurality of training class data of the second class may have different illuminances.

Through the class vector training 110, the training apparatus 100 may propagate the characteristics of the deviation in posture of the set of training class data of the first class to the training class data of the second class. The training apparatus 100 may add the training class data having different postures to the second class. Conversely and/or additionally, the training apparatus 100 may add the training class data having different illuminance to the first class.

Referring to the example 140 of FIG. 1A, the feature sample generator 103 may derive a variation vector 147 from feature vectors of training class data sets 141, 142, 143, and 144 of the first class. The variation vector 147 may reflect different postures of the training class data sets 141, 142, 143, and 144. The feature sample generator 103 may generate new training class data 146 of the second class, having different postures, by reflecting the variation vector 147 of the first class in a feature vector 148 of training class data 145 of the second class. The feature sample generator 103 may add the training class data 146 to the second class.

The training apparatus 100 may train a class vector of each class based on a result of recognizing the training input data. The recognition result may be expressed as a loss value. The training apparatus 100 may train a class vector of each class based on the loss value. For example, the training apparatus 100 may train the class vector of each class in a back-propagation manner to decrease the loss value.

The class vector training 110 and the meta-training 120 described above may be performed by a single training apparatus 100 or may be performed by different pieces of hardware. Hereinafter, for ease of description, it may be assumed that the class vector training 110 and the meta-training 120 are performed by a single training apparatus 100.

Figure 1B:
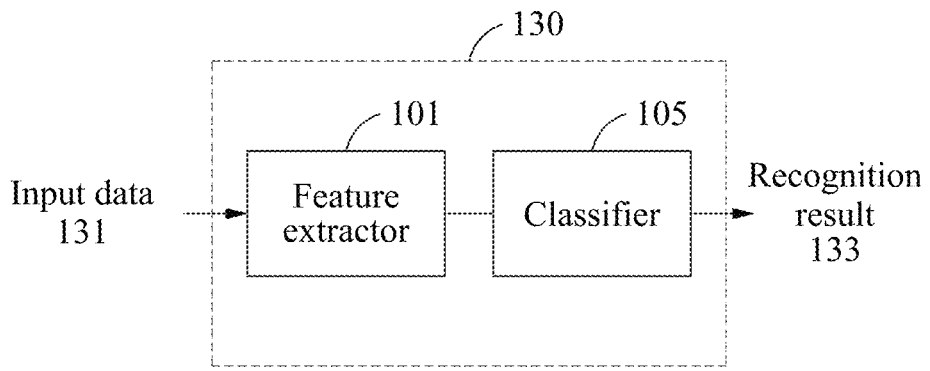
FIG. 1B illustrates an example of performing recognition on input data by a trained recognition apparatus.

FIG. 1B illustrates an example of performing recognition on input data by a trained recognition apparatus (e.g., the recognition apparatus trained in FIG. 1A).

A recognition apparatus 130 may recognize input data 131 using a neural network. The recognition apparatus 130 may determine a class of the input data 131. The recognition apparatus 130 may recognize the class of the input data 131. The recognition apparatus 130 may determine the class of the input data 131 using the neural network trained in advance (e.g., pre-trained) through the training process of FIG. 1A (e.g., through the class vector training 110 and/or the meta-training 120 described above) using a variety of training data.

The neural network included in the recognition apparatus 130 may include the feature extractor 101 and the classifier 105. The feature extractor 101 may extract a feature vector of the input data 131. The classifier 105 may derive a recognition result 133 from the feature vector. The classifier 105 may determine the class of the input data 131 based on the feature vector. The classifier 105 may recognize the class of the input data 131 from the feature vector. Here, the feature extractor 101 and the classifier 105 may be trained in advance together with the feature sample generator 103 (e.g., using the meta-training 120 of FIG. 1A).

In FIGS. 1A and 1B, the training apparatus 100 and the recognition apparatus 130 are shown as separate apparatuses, which, however, is an example only and does not exclude structures other than the example. For example, the training apparatus 100 and the recognition apparatus 130 may be implemented by the same hardware or may be implemented by different pieces of hardware.

The neural network described above may be implemented by hardware or as hardware. For example, the neural network may be stored in a memory to be operated by a general processor or implemented by a neuromorphic processor, or may be implemented in the form of a system on a chip (SoC).

Figure 2:
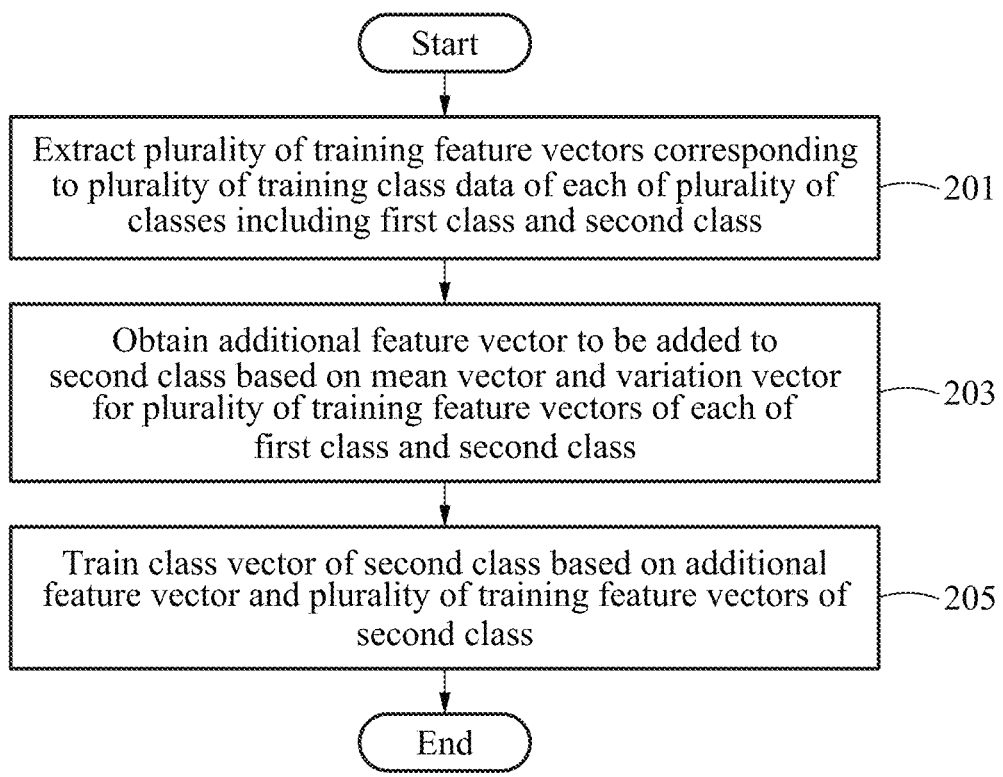
FIG. 2 illustrates an example of a training method.

FIG. 2 illustrates an example of a class vector training method.

In operation 201, the training apparatus 100 may extract a plurality of training feature vectors corresponding to a plurality of training class data of each of a plurality of classes including a first class and a second class using a feature extractor (e.g., the feature extractor 101).

In operation 203, the training apparatus 100 may generate an additional feature vector to be added to the second class based on a mean vector and a variation vector for the plurality of training feature vectors of each of the first class and the second class using a feature sample generator (e.g., the feature sample generator 103). For example, using a feature sample generator, the training apparatus 100 may generate an additional feature vector to be added to the second class based on a mean vector and a variation vector for the plurality of training feature vectors of the first class and a mean vector and a variation vector for the plurality of training feature vectors of the second class. The variation vector may include a variance vector or a standard deviation vector for the plurality of training feature vectors.

The mean vector may be a vector of an elementwise mean value of the plurality of training feature vectors, the variance vector may be a vector of an elementwise variance of the plurality of training feature vectors, and the standard deviation vector may be a vector of an elementwise standard deviation of the plurality of training feature vectors. When the training feature vector is 1×512-dimensional, the mean vector, the variance vector, and the standard deviation vector may each be 1×512-dimensional.

The training apparatus 100 may combine the mean vector of the first class, the variation vector of the first class, the mean vector of the second class, and the variation vector of the second class. When the training feature vector is 1×512-dimensional, a result of the combining may be 1×2048-dimensional.

The training apparatus 100 may output a compressed variation vector from the result of combining. The training apparatus 100 may output the compressed variation vector by inputting the result of combining into one or more fully connected layers fc. The compressed variation vector and the training feature vector may be same-dimensional. For example, the compressed variation vector may be 1×512-dimensional.

The training apparatus 100 may obtain the additional feature vector based on the compressed variation vector and the mean vector of the second class. The training apparatus 100 may obtain the additional feature vector using a Gaussian probability distribution based on the compressed variation vector and the mean vector of the second class. The training apparatus 100 may generate a plurality of feature vectors using the Gaussian probability distribution, and obtain the additional feature vector by sampling the generated plurality of feature vectors.

In operation 205, the training apparatus 100 may train a class vector of the second class based on the additional feature vector and the plurality of training feature vectors of the second class using a classifier (e.g., the classifier 105). The training apparatus 100 may train the class vector of the second class to reduce a distance between the class vector of the second class and a feature vector of training input data corresponding to the second class, with respect to a distance between a class vector of each of the plurality of classes including the second class and the feature vector of the training input data.

The training apparatus 100 may train the class vector of the second class using a loss function. Here, the loss function may include a ratio of an exponential value of a negative distance of the second class to the summation of exponential values of respective negative distances of the plurality of classes. Here, the loss function may represent a probability that the training input data belongs to the corresponding class. For example, the loss function may include a softmax function. The loss function may increase as the distance between the feature vector of the input data and the class vector of the second class decreases.

Figure 3:
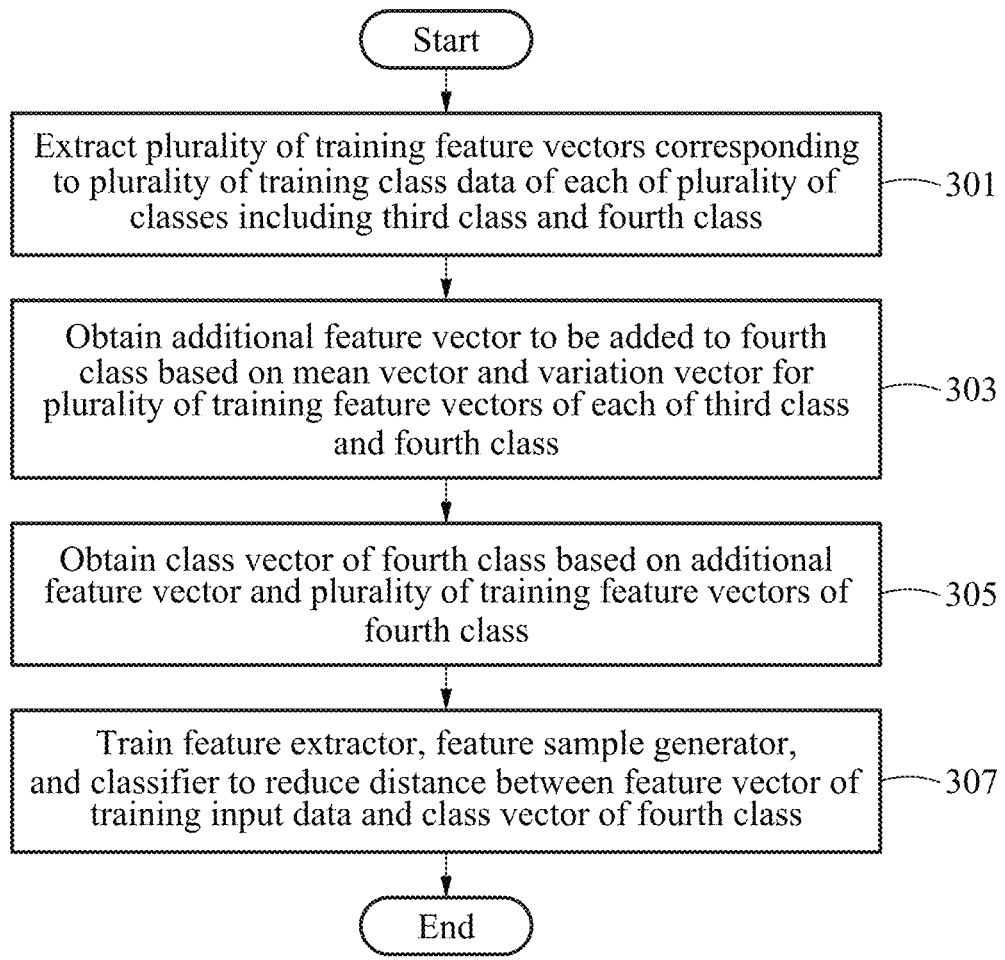
FIG. 3 illustrates an example of a meta-training method.

FIG. 3 illustrates an example of a meta-training method.

In operation 301, the training apparatus 100 may extract a plurality of training feature vectors corresponding to a plurality of training class data of each of a plurality of classes including a third class and a fourth class using a feature extractor (e.g., the feature extractor 101).

In operation 303, the training apparatus 100 may generate an additional feature vector to be added to the fourth class based on a mean vector and a variation vector for the plurality of training feature vectors of each of the third class and the fourth class using a feature sample generator (e.g., the feature sample generator 103). For example, using a feature sample generator, the training apparatus 100 may generate an additional feature vector to be added to the fourth class based on a mean vector and a variation vector for the plurality of training feature vectors of the third class and a mean vector and a variation vector for the plurality of training feature vectors of the fourth class. The variation vector may include a variance vector or a standard deviation vector for the plurality of training feature vectors.

The mean vector may be a vector of an elementwise mean value of the plurality of training feature vectors, the variance vector may be a vector of an elementwise variance of the plurality of training feature vectors, and the standard deviation vector may be a vector of an elementwise standard deviation of the plurality of training feature vectors. When the training feature vector is 1×512-dimensional, the mean vector, the variance vector, and the standard deviation vector may all be 1×512-dimensional.

The training apparatus 100 may combine the mean vector of the third class, the variation vector of the third class, the mean vector of the fourth class, and the variation vector of the fourth class. When the training feature vector is 1×512-dimensional, a result of the combining may be 1×2048-dimensional.

The training apparatus 100 may output a compressed variation vector from the result of combining. The training apparatus 100 may output a compressed variation vector by inputting the result of combining into one or more fully connected layers. The compressed variation vector and the training feature vector may be same-dimensional. For example, the compressed variation vector may be 1×512-dimensional.

The training apparatus 100 may obtain the additional feature vector based on the compressed variation vector and the mean vector of the fourth class. The training apparatus 100 may obtain the additional feature vector using a Gaussian probability distribution based on the compressed variation vector and the mean vector of the fourth class. The training apparatus 100 may generate a plurality of feature vectors using the Gaussian probability distribution, and obtain the additional feature vector by sampling the generated plurality of feature vectors.

In operation 305, the training apparatus 100 may obtain a class vector of the fourth class based on the additional feature vector and the plurality of training feature vectors of the fourth class using a classifier.

In operation 307, the training apparatus 100 trains the feature extractor, the feature sample generator, and the classifier to reduce a distance between a feature vector of training input data and the class vector of the fourth class. The training apparatus 100 may train the feature extractor, the feature sample generator, and the classifier to reduce a distance between the class vector of the fourth class and a feature vector of training input data corresponding to the fourth class with respect to a distance between a class vector of each of the plurality of classes including the fourth class and the feature vector of the training input data.

The training apparatus 100 may train the feature extractor, the feature sample generator, and the classifier through a loss function. Here, the loss function may include a ratio of an exponential value of a negative distance of the fourth class to the summation of exponential values of respective negative distances of the plurality of classes. For example, the loss function may include a softmax function.

Figure 4:
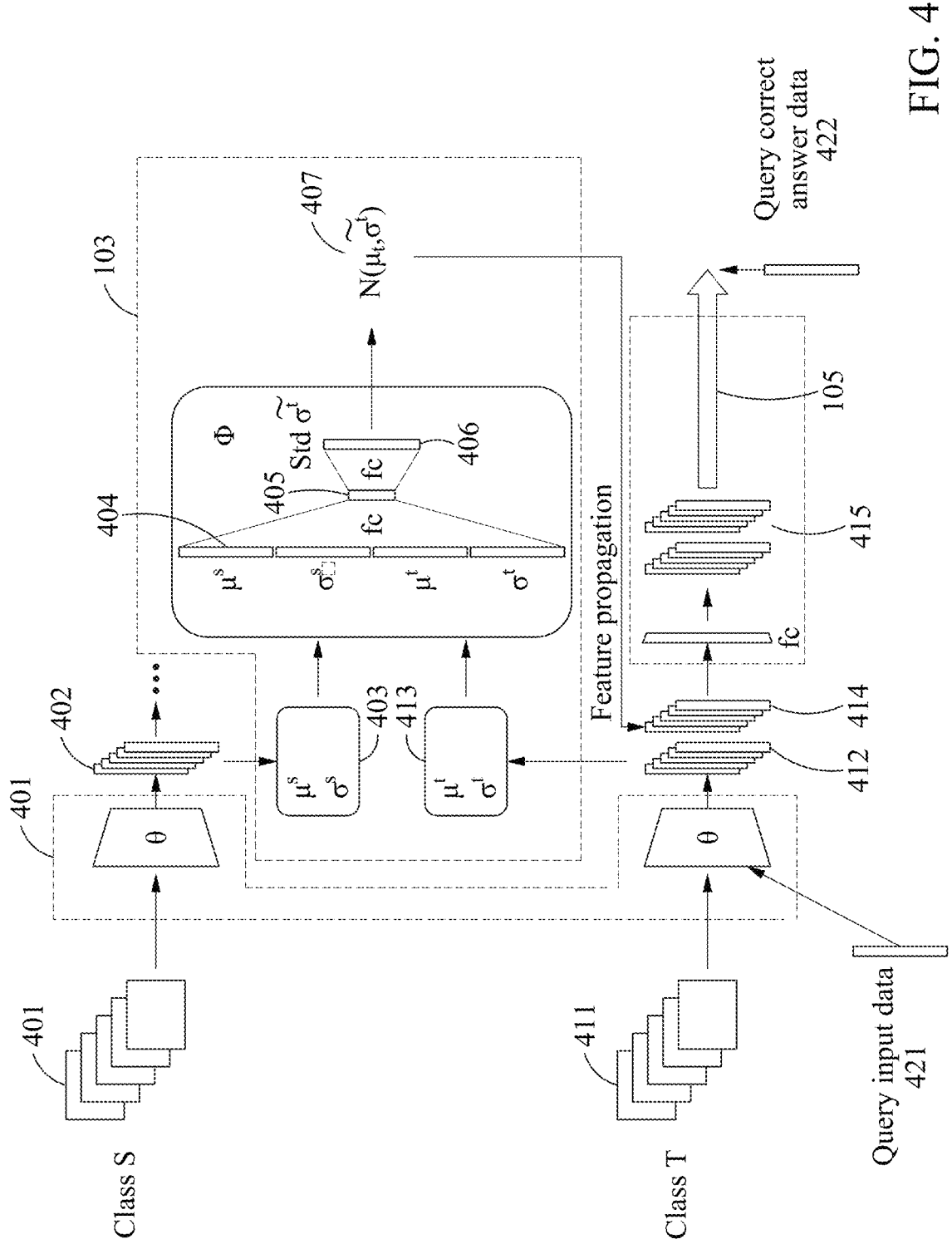
FIG. 4 illustrates an example of a configuration of a neural network stored in a training apparatus.

FIG. 4 illustrates an example of a configuration of a neural network stored in a training apparatus.

A neural network included in the training apparatus 100 may include the feature extractor 101, the feature sample generator 103, and the classifier 105. Referring to FIG. 4, $\theta$ denotes the feature extractor 101, and $\phi$ denotes the feature sample generator 103. fc denotes a fully connected layer. $\mu_s$ denotes a mean of a class S, and $\mu_t$ denotes a mean of a class T. $\sigma^s$ denotes a standard deviation of the class S, and $\sigma^t$ denotes a standard deviation of the class T. $N(\mu_t, \tilde{\sigma}^t)$ 407 denotes random sampling according to a Gaussian probability distribution for the mean $\mu_t$ and the standard deviation $\tilde{\sigma}^t$.

In meta-training (e.g., the meta-training 120), the training apparatus 100 may input, into the feature extractor 101, training class data 401 and 411 respectively for the class S and the class T that are different from each other. The feature extractor 101 may output training feature vectors 402 for the training class data 401 and training feature vectors 412 for the training class data 411.

The training apparatus 100 may calculate a mean vector and a variation vector of the training feature vectors 402 using the feature sample generator 103. For example, the training apparatus 100 may calculate a mean vector $\mu_s$ and standard deviation vector $\sigma^s$ 403 based on the training feature vectors 402, and the training apparatus 100 may calculate a mean vector $\mu_t$ and standard deviation vector $\sigma^t$ 413 based on the training feature vectors 412.

The training apparatus 100 may determine a combined vector 404 by combining the mean vector $\mu_s$ and standard deviation vector $\sigma^s$ 403 of the class S and the mean vector $\mu_t$ and standard deviation vector $\sigma^t$ 413 of the class T. Here, the combining may include concatenation. The training apparatus 100 may input the combined vector 404 into one or more fully connected layers. For example, the combined vector 404 may become an intermediate vector 405 through a fully connected layer, and the intermediate vector 405 may become a compressed vector 406 through a next fully connected layer. The compressed vector 406 may be lower-dimensional than the combined vector 404. The compressed vector 406 may be a new standard deviation vector $\tilde{\sigma}^t$ to be applied to the class T.

The training apparatus 100 may generate a new training feature vector using a Gaussian probability distribution according to the existing mean vector $N(\mu_t, \tilde{\sigma}^t)$ and the standard deviation vector $\mu_t$ of the class T, as expressed by $\tilde{\sigma}'$. The training apparatus 100 may sample additional new training feature vectors 414 to be added to the class T among the generated plurality of training feature vectors.

The training apparatus 100 may input the training feature vectors 412 and the additional feature vectors 414 into the classifier 105. The training feature vectors 412 and the additional feature vectors 414 may be output as one or more class vectors 415 through a fully connected layer.

The training apparatus 100 may compare the output to query correct answer data 422 by inputting query input data 421 into the neural network. The training apparatus 100 may calculate a distance between the feature vector of the query input data 421 and the class vector 415 of each class. The training apparatus 100 may select a class vector of the query correct answer data 422 corresponding to a correct answer class of the query input data 421. The training apparatus 100 may calculate the distance between the class vector of the correct answer class and the query input data 421.

The training apparatus 100 may train the neural network to reduce a distance between the class vector of the correct answer class and the query input data 421 with respect to a distance between the class vector of the query input data 421 and the class vector 415 of each class. The training apparatus 100 may use, as a loss function, a negative exponential value of a distance of the feature vector for the correct answer class with respect to the summation of negative exponential values of distances of feature vectors for each of all the classes. The loss function may indicate a probability of getting a correct answer. The training apparatus 100 may train the neural network such that the loss function is close to "1".

FIG. 5 illustrates an example of a meta-training method (e.g., the meta-training 120) and a class vector training method (e.g., the class vector training 110).

The training apparatus 100 may first perform meta-training 120. In the meta-training 120, the training apparatus 100 may train the neural network in advance (e.g., in advance of the class vector training 110) using training class data of various types of classes. The training apparatus 100 may train the neural network for a plurality of episodes. The training apparatus 100 may train a feature extractor (e.g., feature extractor 101), a feature sample generator (e.g., the feature sample generator 103), and a classifier (e.g., the classifier 105) of the neural network used in class vector training 110, in advance of the class vector training 110.

In the meta-training 120, each episode may include a plurality of training class data for each of a plurality of classes. For example, a first episode may correspond to determining a class corresponding to training input data, among class 1, class 2, class 3, class 4, and class 5. The training apparatus 100 may train the neural network using a plurality of training class data belonging to each class. The training apparatus 100 may secure more sufficient training class data by performing feature propagation between classes. The training apparatus 100 may obtain an additional feature vector to be used for training by sharing a variation vector of training class data of each class between classes. The training apparatus 100 may train the neural network to recognize training input data of the first episode as a correct answer class.

A second episode may be correspond to determining a class corresponding to the training input data, among class 1, class 2, class 3, class 4, and class 5. The training apparatus 100 may train the neural network using a plurality of training class data belonging to each class. The training apparatus 100 may secure more sufficient training class data by performing feature propagation between classes. Here, the plurality of training class data of the second episode may be different from the plurality of training class data of the first episode. The training apparatus 100 may train the neural network to recognize training input data of the second episode as a correct answer class. The neural network trained in this way may derive a class vector with higher recognition rate for a predetermined episode.

When the meta-training 120 described above is completed, the training apparatus 100 may perform class vector training 110. The class vector training 110 trains high-accuracy training class data for a predetermined episode. The training apparatus 100 may train a class vector of each class included in the classifier using the neural network including the feature extractor, the feature sample generator, and the classifier trained through the meta-training 120. The training apparatus 100 may train the class vector of each class using the training class data of each of class 1, class 2, class 3, class 4, and class 5. The training apparatus 100 may secure more sufficient training class data by performing feature propagation between classes, thereby training a high-accuracy class vector.

Figure 6:
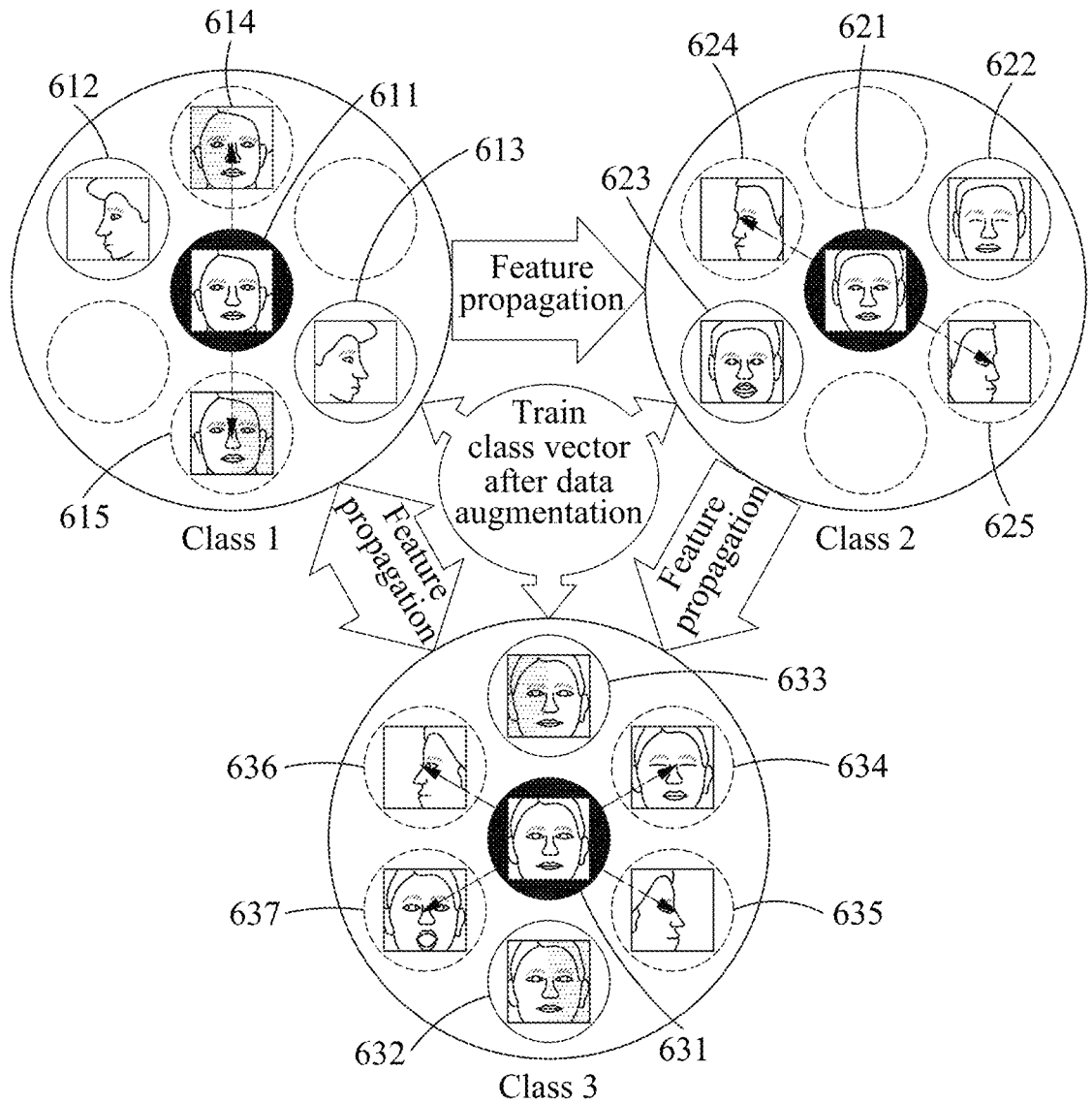
FIG. 6 illustrates an example of feature propagations performed in a meta-training method and a class vector training method.

FIG. 6 illustrates an example of feature propagations performed in a meta-training method (e.g., the meta-training 120) and a class vector training method (e.g., the class vector training 110).

The training apparatus 100 may perform data augmentation and train class data of each class using the augmented training class data. The training apparatus 100 may perform data augmentation by sharing the characteristics of sets of training class data of different classes. Referring to FIG. 6, the training apparatus 100 may perform data augmentation on training class data of class 1, class 2, and class 3. The training apparatus 100 may perform data augmentation by propagating the features of each class between classes.

Class 1 may include training class data 611, 612, and 613. Class 2 may include training class data 621, 622, and 623. Class 3 may include training class data 631, 632, and 633.

The training apparatus 100 may propagate the features of the set of training class data of class 1 to class 2. The training class data 611, 612, and 613 of class 1 may have different postures. The training apparatus 100 may propagate the features of the training class data 611, 612, and 613 having different postures to class 2. Based on the propagating, the training apparatus 100 may add the training class data 624 and 625 having different postures from that of the training class data 621 to class 2.

The training apparatus 100 may propagate the features of the set of training class data of class 2 to class 3. The training class data 621, 622, and 623 of class 2 may have different facial expressions. The training apparatus 100 may propagate the features of the training class data 621, 622, and 623 having different facial expressions and the features of the training class data 624 and 625 having different postures to class 3. Based on the propagating, the training apparatus 100 may add, to class 3, training class data 634 and 637 having facial expressions different from those of the training class data 631 and training class data 635 and 636 having postures different from those of the training class data 631.

The training apparatus 100 may propagate the features of the set of training class data of class 3 to class 1. The training class data 631, 632, and 633 of class 3 may have different illuminances. The training apparatus 100 may propagate the features of the training class data 631, 632, and 633 having different illuminances to class 1. The training apparatus 100 may add training class data 614 and 615 having illuminances different from those of the training class data 611 to class 1.

Figure 7:
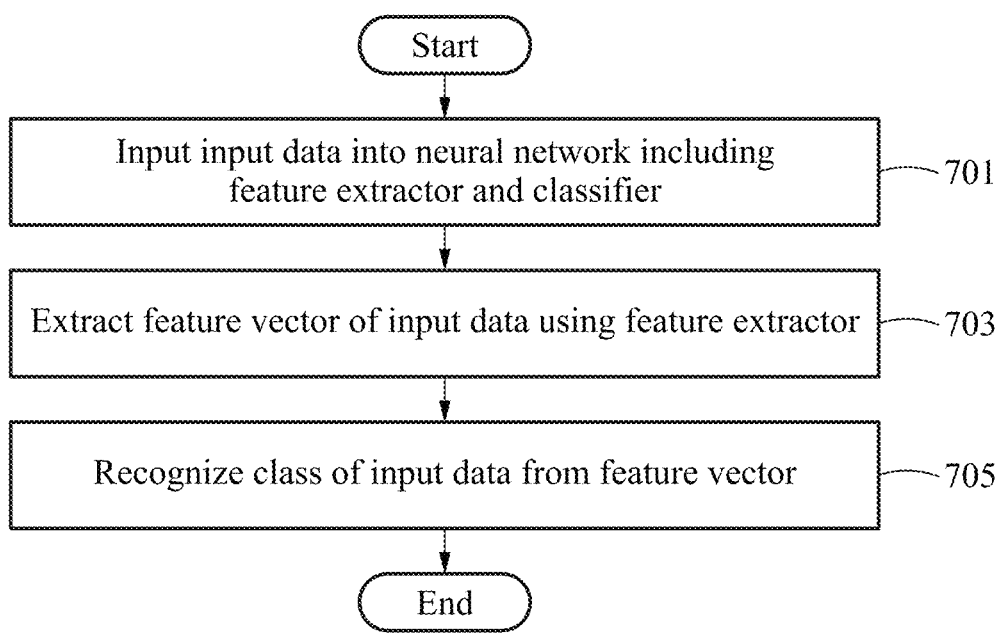
FIG. 7 illustrates an example of a recognition method.

FIG. 7 illustrates an example of a recognition method.

In operation 701, the recognition apparatus 130 may input input data to a neural network including a feature extractor (e.g., the feature extractor 101) and a classifier (e.g., the classifier 105). In operation 703, the recognition apparatus 130 may extract a feature vector of the input data using the feature extractor. In operation 705, the recognition apparatus 130 may recognize a class of the input data from the feature vector using the classifier.

Here, the classifier may include a class vector of the second class. The class vector of the second class may be trained in advance by the classifier based on an additional feature vector for the second class and a plurality of training feature vectors of the second class. The additional feature vectors may be obtained in advance by a feature sample generator (e.g., the feature sample generator 103) based on a mean vector and a variation vector for a plurality of training feature vectors of each of the first class and the second class.

Figure 8:
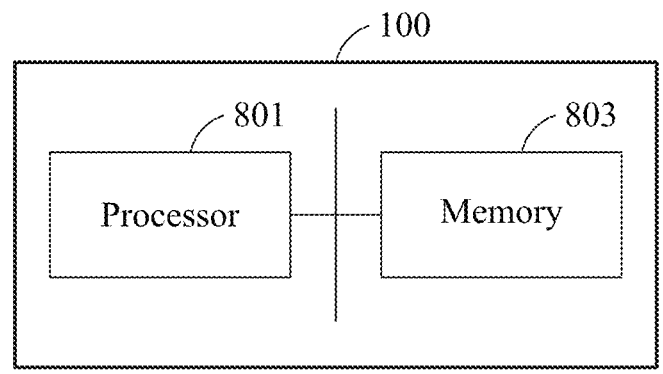
FIG. 8 illustrates an example of a configuration of a training apparatus.

FIG. 8 illustrates an example of a configuration of a training apparatus.

The training apparatus 100 may include a processor 801 (e.g., one or more processors), and a memory 803 (e.g., one or more memories) configured to store a neural network including a feature extractor, a feature sample generator, and a classifier (e.g., the feature extractor 101, the feature sample generator 103, and the classifier 105, respectively).

The processor 801 may extract, using the feature extractor, a plurality of training feature vectors corresponding to a plurality of training class data of each of a plurality of classes including a first class and a second class. The processor 801 may obtain, using the feature sample generator, an additional feature vector to be added to the second class based on a mean vector and a variation vector for the plurality of training feature vectors of each of the first class and the second class.

The processor may obtain, using the classifier, a class vector of the second class based on the additional feature vector and the plurality of training feature vectors of the second class. Thereafter, the processor 801 may train the class vector of the second class to reduce a distance between a feature vector of training input data and the class vector of the second class.

Figure 9:
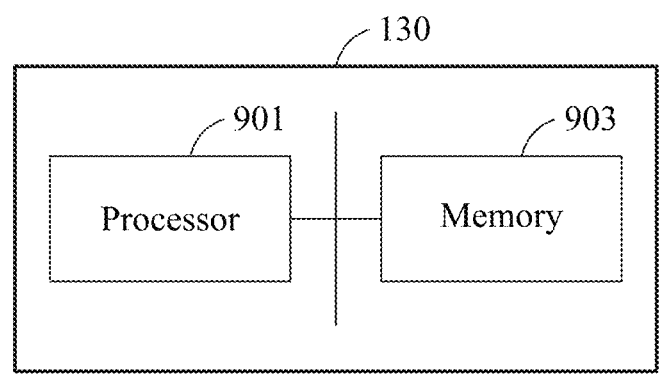
FIG. 9 illustrates an example of a configuration of a recognition apparatus.

FIG. 9 illustrates an example of a configuration of a recognition apparatus.

The recognition apparatus 130 includes a processor 901 (e.g., one or more processors), and a memory 903 (e.g., one or more memories) configured to store a neural network including a feature extractor and a classifier (e.g., the feature extractor 101 and the classifier 105, respectively). The processor 901 may extract a feature vector of input data using the feature extractor and recognize a class of the input data from the feature vector using the classifier.

Here, the classifier may include a class vector of the second class. In class vector training, the class vector of the second class may be trained by the classifier based on an additional feature vector for the second class and a plurality of training feature vectors of the second class. The additional feature vector may be obtained by the feature sample generator based on a mean vector and a variation vector for a plurality of training feature vectors of each of the first class and the second class.

Further, the feature extractor, the feature sample generator, and the classifier may be trained through meta-training in advance of class vector training to reduce a distance between a feature vector of training input data and a class vector of a fourth class. The class vector of the fourth class may be obtained based on a plurality of training feature vectors of the fourth class and an additional feature vector for the fourth class, and the additional feature vector may be obtained based on a mean vector and a variation vector for a plurality of training feature vectors for each of a third class and the fourth class.

FIGS. 8 and 9 illustrate an example of the training apparatus and the recognition apparatus being separated, which, however, does not exclude an example in which training and recognition is performed by the same apparatus. For example, the training apparatus 100 and the recognition apparatus 130 may be a same apparatus in one or more embodiments. Further, the meta-training method and the class vector training method may be performed by the same apparatus or may be performed by different apparatuses. For example, the meta-training method, the class vector training method, and the recognition method may be performed by the same apparatus. As another example, the meta-training method and the class vector training method may be performed by a training apparatus, and the recognition method may be performed by a recognition apparatus different from the training apparatus. As another example, the meta-training method, the class vector training method, and the recognition method may be performed different apparatuses.

The training apparatuses, feature extractors, feature sample generators, classifiers, recognition apparatuses, processors, memories, training apparatus 100, feature extractor 101, feature sample generator 103, classifier 105, recognition apparatus 130, processor 801, memory 803, processor 901, memory 903, and other apparatuses, devices, units, modules, and components described herein with respect to FIGS. 1-9 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-9 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions used herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

What is claimed is:

1. A processor-implemented neural network method, the method comprising:

extracting, by a feature extractor of a neural network, a plurality of training feature vectors corresponding to a plurality of training class data of each of a plurality of classes including a first class and a second class;

determining, by a feature sample generator of the neural network, an additional feature vector of the second class based on a mean vector and a variation vector of the plurality of training feature vectors of each of the first class and the second class; and training a class vector of the second class included in a classifier of the neural network based on the additional feature vector and the plurality of training feature vectors of the second class, wherein the determining comprises:

combining the mean vector of the first class, the variation vector of the first class, the mean vector of the second class, and the variation vector of the second class;

outputting a compressed variation vector from a result of the combining; and determining the additional feature vector based on the compressed variation vector and the mean vector of the second class.

2. The method of claim 1, wherein the training comprises training the class vector of the second class to reduce a distance between the class vector of the second class and a feature vector of training input data corresponding to the second class with respect to a distance between a class vector of each of the plurality of classes and the feature vector of the training input data.

3. The method of claim 2, wherein
the training comprises training the class vector of the second class using a loss function, and
the loss function includes a ratio of an exponential value of a negative distance of a correct answer class to a summation of exponential values of respective negative distances of the plurality of classes.

4. The method of claim 3, wherein the loss function includes a softmax function.

5. The method of claim 1, wherein the variation vector includes either one of a variance vector and a standard deviation vector of the plurality of training feature vectors.

6. The method of claim 5, wherein
the mean vector is a vector of an elementwise mean value of the plurality of training feature vectors,
the variance vector is a vector of an elementwise variance of the plurality of training feature vectors, and
the standard deviation vector is a vector of an elementwise standard deviation of the plurality of training feature vectors.

7. The method of claim 1, wherein the determining of the additional feature vector based on the compressed variation vector and the mean vector of the second class comprises determining the additional feature vector using a Gaussian probability distribution based on the compressed variation vector and the mean vector of the second class.

8. The method of claim 7, wherein the determining of the additional feature vector based on the compressed variation vector and the mean vector of the second class comprises:
generating a plurality of feature vectors using the Gaussian probability distribution; and
determining the additional feature vector by sampling the generated plurality of feature vectors.

9. A non-transitory computer-readable storage medium storing instructions that, when executed by one or more processors, configure the one or more processors to perform the method of claim 1.

10. A processor-implemented neural network method, the method comprising:
extracting, by a feature extractor of a neural network, a plurality of training feature vectors corresponding to a plurality of training class data of each of a plurality of classes including a third class and a fourth class;
determining, by a feature sample generator of the neural network, an additional feature vector of the fourth class based on a mean vector and a variation vector of the plurality of training feature vectors of each of the third class and the fourth class;
determining, by a classifier of the neural network, a class vector of the fourth class based on the additional feature vector and the plurality of training feature vectors of the fourth class; and
training the feature extractor, the feature sample generator, and the classifier to reduce a distance between the class vector of the fourth class and a feature vector of training input data corresponding to the fourth class with respect to a distance between a class vector of each of the plurality of classes including the fourth class and the feature vector of the training input data.

11. A neural network apparatus, comprises:
a memory configured to store a neural network including a feature extractor, a feature sample generator, and a classifier; and
one or more processors configured to:
extract, by the feature extractor, a plurality of training feature vectors corresponding to a plurality of training class data of each of a plurality of classes including a first class and a second class,
determine, by the feature sample generator, an additional feature vector of the second class based on a mean vector and a variation vector of the plurality of training feature vectors of each of the first class and the second class, determine, by the classifier, a class vector of the second class based on the additional feature vector and the plurality of training feature vectors of the second class, and
train the class vector of the second class to reduce a distance between the class vector of the second class and a feature vector of training input data,
wherein the one or more processors are further configured to:
extract, by the feature extractor, a feature vector of received input data; and
recognize, by the classifier, a class of the received input data as the second class, based on the trained class vector of the second class.

12. A neural network apparatus, comprising:
a memory configured to store a neural network including a feature extractor, a feature sample generator, and a classifier; and
one or more processors configured to:
extract, by the feature extractor, a plurality of training feature vectors corresponding to a plurality of training class data of each of a plurality of classes including a third class and a fourth class,
determine, by the feature sample generator, an additional feature vector of the fourth class based on a mean vector and a variation vector of the plurality of training feature vectors of each of the third class and the fourth class, determine, by the classifier, a class vector of the fourth class based on the additional feature vector and the plurality of training feature vectors of the fourth class, and
train the feature extractor, the feature sample generator, and the classifier to reduce a distance between the class vector of the fourth class and a feature vector of training input data corresponding to the fourth class with respect to a distance between a class vector of each of the plurality of classes including the fourth class and the feature vector of the training input data.

13. A processor-implemented training method, the method comprising:
extracting, by a feature extractor of a neural network, a plurality of training feature vectors of training class data of a class;
generating, by a feature sample generator of a neural network, a variation vector of the class based on the extracted training feature vectors of training class data of the class;
generating, by the feature sample generator, an additional feature vector of another class based the variation vector of the class; and
training the neural network based on the additional feature vector,
wherein the training of the neural network comprises:
training the feature extractor, the feature sample generator, and a classifier of the neural network to reduce a distance between a class vector of the other class, determined based on the additional feature vector, and a feature vector of training input data corresponding to the other class; and using the trained feature extractor, the trained sample generator, and the trained classifier, training the class vector of the other class based on the additional feature vector and a plurality of training feature vectors of training class data of the other class.

14. The method of claim 13, wherein
the generating of the additional feature vector is further based on a variation vector of the other class,
the variation vector of the class indicates a variation between the training class data of the class in any one of illuminance, posture, facial expression, occlusion, shape change, and noise, and
the variation vector of the other class indicates a variation between the training class data of the other class in any other one of illuminance, posture, facial expression, occlusion, shape change, and noise.

* * * * *